United States Patent
Hsu et al.

(10) Patent No.: US 10,352,354 B1
(45) Date of Patent: Jul. 16, 2019

(54) POSITIONABLE HINGE MECHANISM AND ANGULARLY POSITIONABLE FLEXIBLE DISPLAY DEVICE HAVING THE SAME

(71) Applicant: FOSITEK CORPORATION, New Taipei (TW)

(72) Inventors: An-Szu Hsu, New Taipei (TW); Way-Han Dai, New Taipei (TW); Chun-Han Lin, New Taipei (TW)

(73) Assignee: Fositek Corporation, New Taipei (TW)

(*) Notice: Subject to any disclaimer, the term of this patent is extended or adjusted under 35 U.S.C. 154(b) by 0 days.

(21) Appl. No.: 16/109,906

(22) Filed: Aug. 23, 2018

(30) Foreign Application Priority Data

Mar. 28, 2018 (TW) .............................. 107203991 U (51) Int. Cl.
| | | |
|---|---|---|
| *E05D 7/00* | (2006.01) | |
| *E05D 3/06* | (2006.01) | |
| *F16C 11/04* | (2006.01) | |
| *G06F 1/16* | (2006.01) | |
| *E05D 3/18* | (2006.01) | |
| *E05D 3/12* | (2006.01) | |

(52) U.S. Cl.
CPC ............ *F16C 11/04* (2013.01); *G06F 1/1616* (2013.01); *G06F 1/1681* (2013.01); *E05D 3/122* (2013.01); *E05D 3/18* (2013.01); *E05Y 2900/606* (2013.01)

(58) Field of Classification Search
CPC ... Y10T 16/542; Y10T 16/543; Y10T 16/544; Y10T 16/5443; Y10T 16/5445; Y10T 16/5448; Y10T 16/545; Y10T 16/54038; G06F 1/16; G06F 1/1616; G06F 1/1681; G06F 1/166; G06F 1/1679; H04M 1/022; H04M 1/0214; H04M 1/0216; H04M 1/0222; H05K 5/0086; H05K 5/0226; F16M 11/10; E05D 3/18; E05D 3/122; E05D 3/12; E05D 3/16; E05D 3/06; E05D 15/28; E05D 15/30; E05D 15/32; E05D 15/40; E05D 1/04; E05D 2001/045; E05D 11/06; E05D 11/1021; E05D 11/1078; E05D 11/082; E05D 3/32; E05D 2900/606

See application file for complete search history.

(56) References Cited

U.S. PATENT DOCUMENTS 8,104,144 B2 * 1/2012 Wang ..................... G06F 1/1681
   16/354
8,111,506 B2 * 2/2012 Wang .................. H04M 1/0237
   16/367

(Continued)

*Primary Examiner* — Chuck Y Mah
(74) *Attorney, Agent, or Firm* — Michael Best & Friedrich LLP (57) ABSTRACT

An angularly positionable flexible display device includes a flexible display, a first substrate, a second substrate, and a positionable hinge mechanism which is disposed in a mounting space defined between the first and second substrates. In response to application of a manual force upon at least one of the first and second substrates, the first substrate is angularly displaceable relative to the second substrate through the positionable hinge mechanism to permit the flexible display to be bent with the angular displacement of the first and second substrates. Once the manual force is release, the first substrate is angularly positioned relative to the second substrate through frictional force provided by the positionable hinge mechanism.

10 Claims, 12 Drawing Sheets

(56) References Cited

U.S. PATENT DOCUMENTS

| | | | | |
|---|---|---|---|---|
| 8,272,104 B2* | 9/2012 | Chen | .................... | G06F 1/1616 |
| | | | | 16/327 |
| 8,281,459 B2* | 10/2012 | Le | .......................... | E05D 3/022 |
| | | | | 16/350 |
| 8,434,197 B2* | 5/2013 | Oshima | .................. | E05D 3/186 |
| | | | | 16/241 |
| 9,464,471 B1* | 10/2016 | Chen | .................... | G06F 1/1681 |
| 9,524,000 B2* | 12/2016 | Hsu | ....................... | G06F 1/1681 |
| 9,860,999 B1* | 1/2018 | Hsu | ....................... | E05D 3/06 |
| 9,999,144 B2* | 6/2018 | Xu | .......................... | E05D 3/122 |
| 10,152,094 B1* | 12/2018 | Holung | .................. | E05D 3/122 |
| 2010/0283367 A1* | 11/2010 | Coleman | ................ | E05D 3/022 |
| | | | | 312/405 |
| 2012/0120618 A1* | 5/2012 | Bohn | .................... | G06F 1/1618 |
| | | | | 361/749 |
| 2012/0227217 A1* | 9/2012 | Chen | .................... | G06F 1/1681 |
| | | | | 16/366 |
| 2015/0159413 A1* | 6/2015 | Chen | ....................... | E05D 3/122 |
| | | | | 16/342 |
| 2015/0267450 A1* | 9/2015 | Chiang | ................ | G06F 1/1681 |
| | | | | 16/354 |
| 2015/0342068 A1* | 11/2015 | Su | ......................... | G06F 1/1681 |
| | | | | 16/354 |
| 2015/0362958 A1* | 12/2015 | Shang | .................. | G06F 1/1681 |
| | | | | 361/679.58 |
| 2016/0215540 A1* | 7/2016 | Yuan | .................... | G06F 1/1616 |
| 2017/0235337 A1* | 8/2017 | Vic | .......................... | E05D 3/12 |
| | | | | 361/679.55 |
| 2018/0067520 A1* | 3/2018 | Maata | .................. | G06F 1/1681 |
| 2019/0050028 A1* | 2/2019 | Chung | .................. | G06F 1/1681 |

* cited by examiner

POSITIONABLE HINGE MECHANISM AND ANGULARLY POSITIONABLE FLEXIBLE DISPLAY DEVICE HAVING THE SAME

CROSS-REFERENCE TO RELATED APPLICATION

This application claims priority from Taiwanese utility model patent application no. 107203991, filed on Mar. 28, 2018.

FIELD

The disclosure relates to a positionable hinge mechanism, more particularly to a positionable hinge mechanism for an angularly positionable flexible display device.

BACKGROUND

U.S. Pat. No. 9,856,909 discloses a conventional hinge assembly which includes a mounting seat and a linkage unit in the mounting seat. A connection member is connected between first and second movable portions of the linkage unit by a linkage spindle. The linkage unit is able to rotate by a resilient unit to a spring-out state from a folded state. When the linkage unit reaches the spring-out state, further rotation of the linkage unit is stopped by a limiting unit. A torque spindle provides torsional resistance only when the linkage unit is rotated further from the spring-out state.

SUMMARY

An object of the disclosure is to provide a novel positionable hinge mechanism for an angularly positionable flexible display device.

According to an aspect of the disclosure, a positionable hinge mechanism for angularly positioning a first substrate relative to a second substrate is provided. Each of the first and second substrates has an outer side surface, and an inner side surface which is opposite to the outer side surface, and which has a slot that extends toward the outer side surface to terminate at a slot end. Each of the first and second substrates has a supporting major surface and a mounting major surface opposite to the support major surface. Each of the supporting and mounting major surfaces interconnects the respective outer and inner side surfaces. The inner side surfaces of the first and second substrates are disposed adjacent to each other to permit the slots of the first and second substrates to define a mounting space. The positionable hinge mechanism is adapted to be disposed in the mounting space, and includes a first sliding body, a second sliding body, a shift pin, a guiding unit, a first force-transmission unit, and a second force-transmission unit. The second sliding body is displaced from the first sliding body in a left-and-right direction. The shift pin is coupled between the first and second sliding bodies. The guiding unit extends in the left-and-right direction to guide movement of the first sliding body relative to the second sliding body in the left-and-right direction between a close position and a remote position. The first and second force-transmission units are disposed on the first and second sliding bodies, respectively. Each of the first and second force-transmission units is configured to be coupled to the shift pin, and is coupled to be driven by a respective one of the first and second substrates such that in response to application of a manual force upon at least one of the first and second substrates, the first sliding body is moveable relative to the second sliding body between the close position and the remote position, and such that once the manual force is released, the first sliding body is immovable relative to the second sliding body, thereby angularly positioning the first substrate relative to the second substrate.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 1:
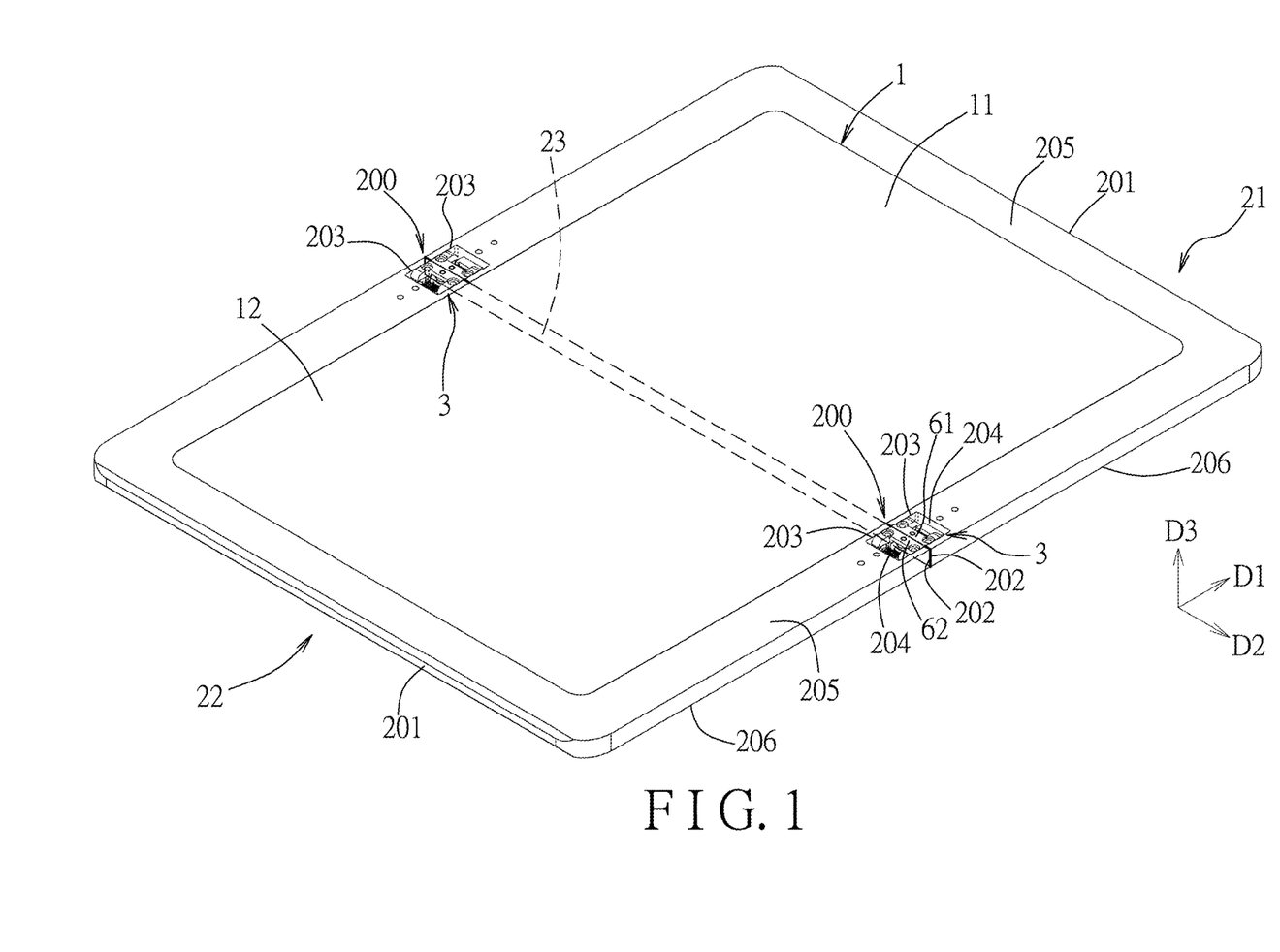
FIG. 1 is a perspective view of an angularly positionable flexible display device according to an embodiment of the disclosure.
Figure 2:
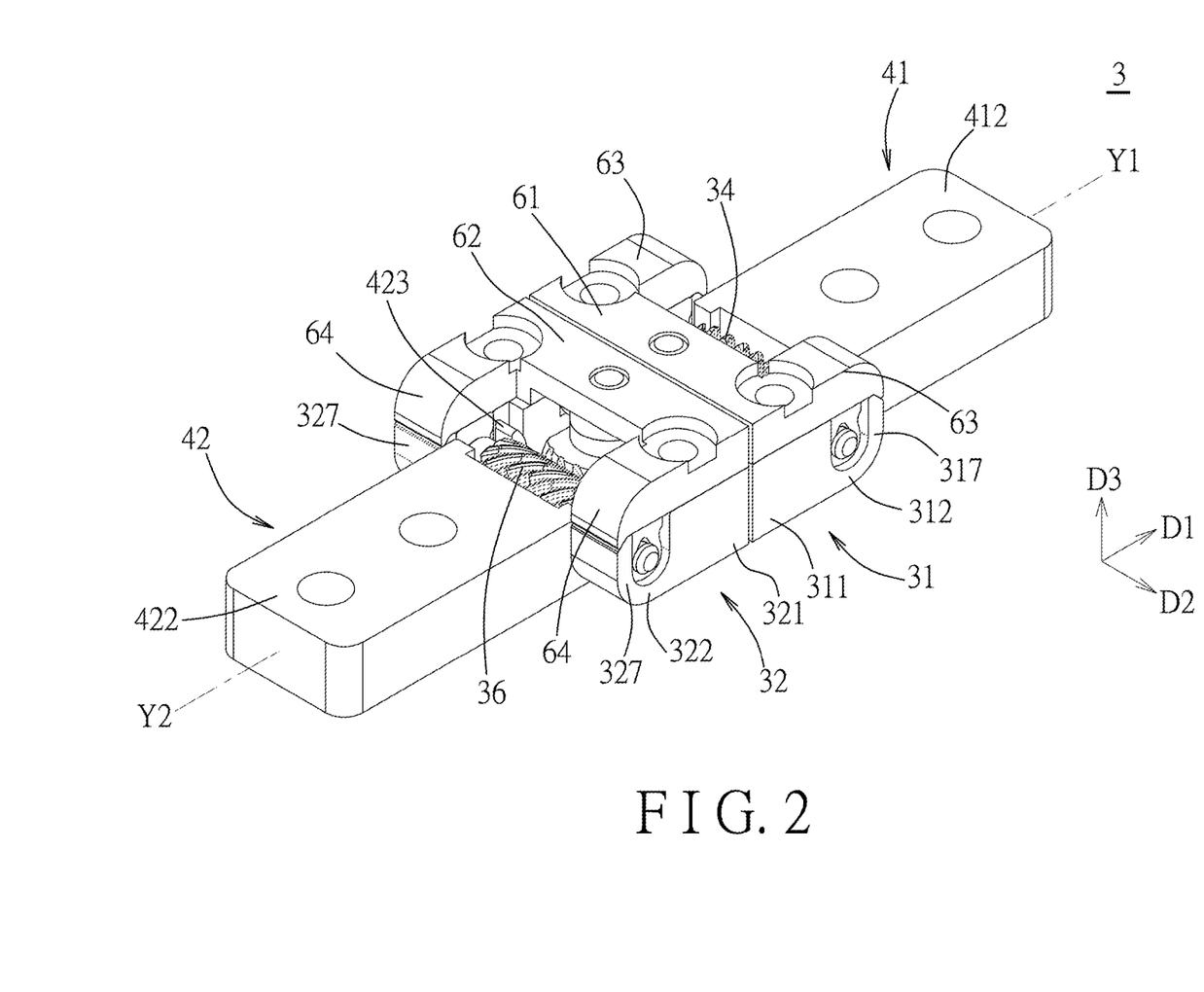
FIG. 2 is a perspective view of a positionable hinge mechanism of the angularly positionable flexible display device.
Figure 11:
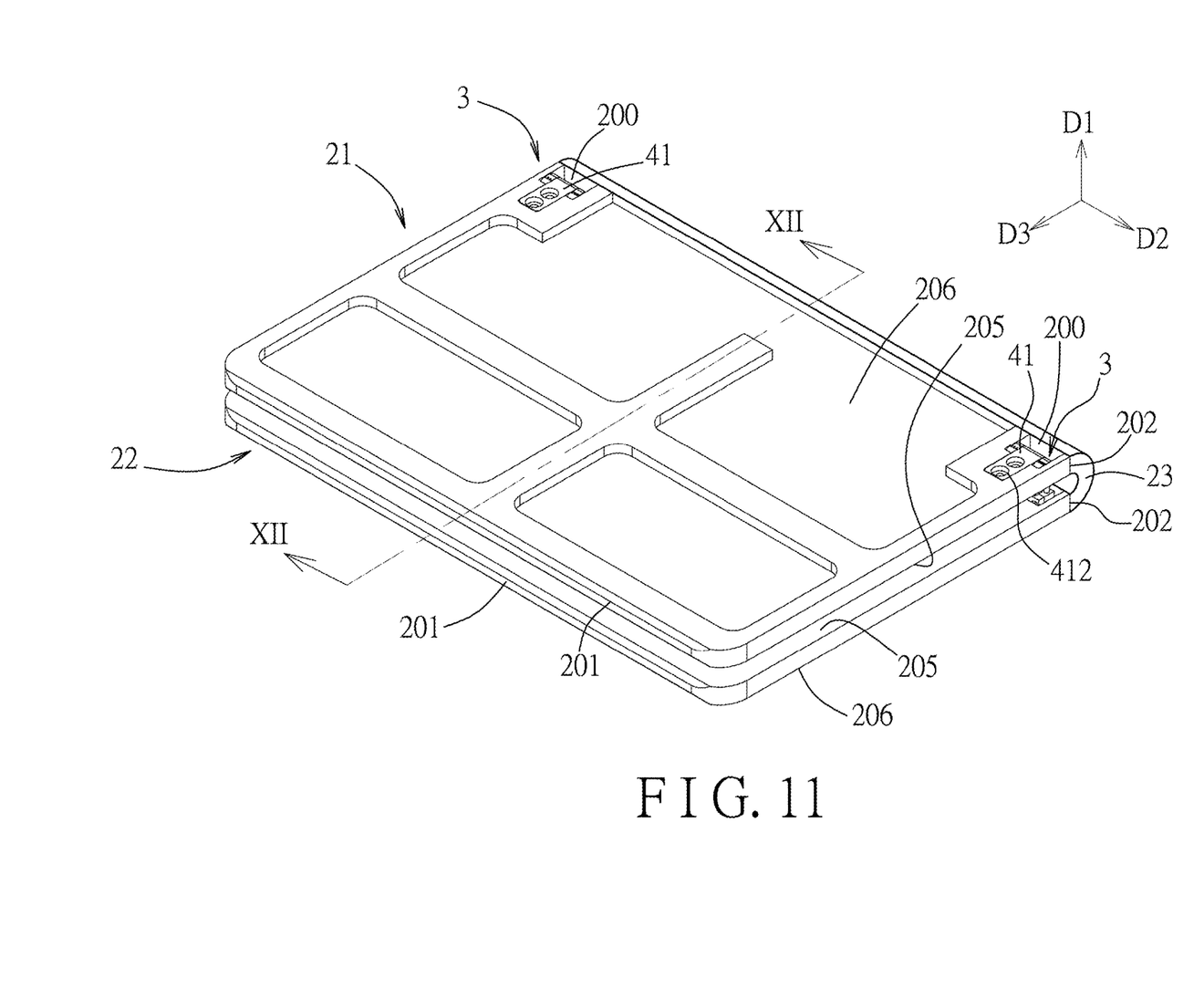
FIG. 11 is a perspective view of the angularly positionable flexible display device when both of the first and second mounting blocks of the positionable hinge mechanism are in the converted position.

Referring to FIGS. 1, 2, and 11, an angularly positionable flexible display device is shown to include a flexible display 1, a first substrate 21, a second substrate 22, and at least one positionable hinge mechanism 3.

Each of the first and second substrates 21, 22 has an outer side surface 201, an inner side surface 202 opposite to the outer side surface 201, a supporting major surface 205, and a mounting major surface 206 opposite to the support major surface 205. Each of the supporting and mounting major surfaces 205, 206 interconnects the respective outer and inner side surfaces 201, 202. The inner side surface 202 has at least one slot 203 which extends toward the respective outer side surface 201 to terminate at a slot end 204, and which further extends through the respective supporting and mounting major surfaces 205, 206. The inner side surfaces 202 of the first and second substrates 21, 22 are disposed adjacent to each other to permit the slots 203 of the first and second substrates 21, 22 to define a mounting space 200.

As shown in FIGS. 1 to 4, the positionable hinge mechanism 3 is disposed in the mounting space 200, and includes a first sliding body 31, a second sliding body 32, a guiding unit 33, a first force-transmission unit 340 (including a first worm gear 34 and a first sector gear 35), a second force-transmission unit 360 (including a second worm gear 36 and a second sector gear 37), a shift pin 38, a first mounting block 41, and a second mounting block 42.

Figure 4:
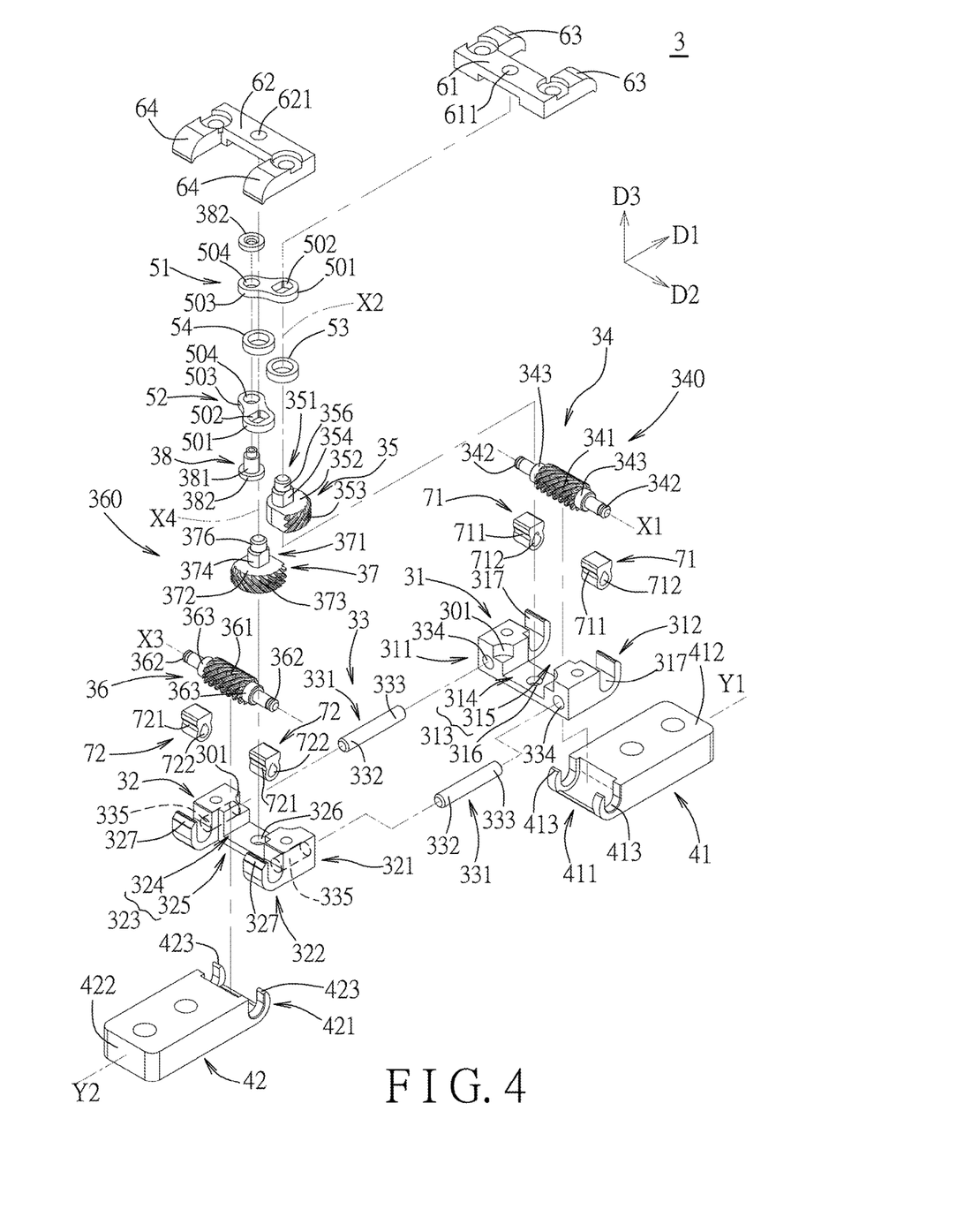
FIG. 4 is an exploded perspective view of the positionable hinge mechanism.

The first sliding body 31 is movably disposed in the slot 203 of the first substrate 21, and has a first left end region 311 and a first right end region 312 which is opposite to the first left end region 311 in a left-and-right direction (D1), and which is proximate to the slot end 204 of the first substrate 21. The first sliding body 31 is formed with a first open groove 313 which extends in the left-and-right direction (D1) through the first left and right end regions 311, 312 to form a first left groove segment 314 and a first right groove segment 315.

The second sliding body 32 is movably disposed in the slot 203 of the second substrate 22 to be displaced from the first sliding body 31 in the left-and-right direction (D1), and has a second right end region 321 confronting the first left end region 311, and a second left end region 322 which is opposite to the second right end region 321 in the left-and-right direction (D1), and which is proximate to the slot end 204 of the second substrate 22. The second sliding body 32 is formed with a second open groove 323 which extends in the left-and-right direction (D1) through the second right and left end regions 321, 322 to form a second right groove segment 324 and a second left groove segment 325.

The guiding unit 33 extends in the left-and-right direction (D1) to guide movement of the first sliding body 31 relative to the second sliding body 32 in the left-and-right direction (D1) between a close position and a remote position. When the first sliding body 31 is in the close position, as shown in FIGS. 1-3 and 5-6, the first left end region 311 and the second right end region 321 are close to each other. When the first sliding body 31 is in the remote position, as shown in FIGS. 7-11, the first left end region 311 and the second right end region 321 are remote from each other.

As shown in FIGS. 3-6, the first worm gear 34 extends along a first longitudinal axis (X1) in a front-and-rear direction (D2), and has a first worm body 341. The first worm gear 34 is rotatably mounted on the first right end region 312 about the first longitudinal axis (X1) to permit the first worm body 341 to be disposed in the first right groove segment 315.

The first sector gear 35 is rotatably mounted in the first left groove segment 314 about a first upright axis (X2) in an upright direction (D3), and includes a first shaft 351 and a first gear body 352. The first shaft 351 extends along the first upright axis (X2). The first gear body 352 extends radially from the first shaft 351 to terminate at a first gear region 353 which is configured to mesh with the first worm body 341 with a first friction force to permit the first sector gear 35 to be driven by the first worm gear 34 to rotate about the first upright axis (X2).

The second worm gear 36 extends along a second longitudinal axis (X3) in the front-and-rear direction (D2), and has a second worm body 361. The second worm gear 36 is rotatably mounted on the second left end region 322 about the second longitudinal axis (X3) to permit the second worm body 361 to be disposed in the second left groove segment 325.

The second sector gear 37 is rotatably mounted in the second right groove segment 324 about a second upright axis (X4) in the upright direction (D3), and which includes a second shaft 371 and a second gear body 372. The second shaft 371 extends along the second upright axis (X4). The second gear body 372 extends radially from the second shaft 371 to terminate at a second gear region 373 which is configured to mesh with the second worm body 361 with a second friction force to permit the second sector gear 37 to be driven by the second worm gear 36 to rotate about the second upright axis (X4).

Although the first and second sector gears 35, 37 are used in this embodiment, those gears 35, 37 should not be limited to the sector form. In other embodiments, two wheel-gears each having a sector segment for serving the respective sector gear 35 or 37 may be used as long as the two wheel-gears do not mesh with each other.

Figure 5:
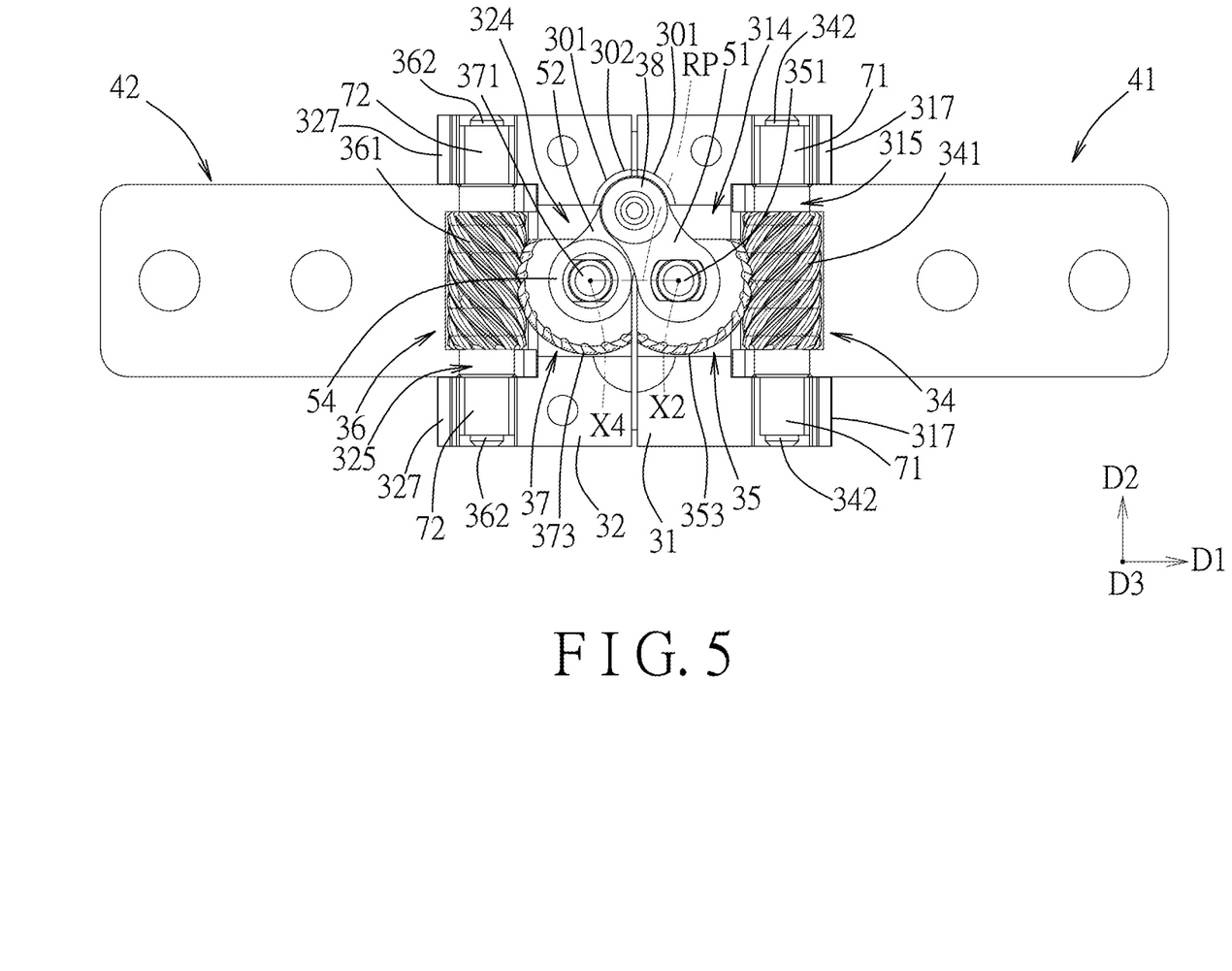
FIG. 5 is similar to FIG. 3 in which first and second cover plates and first and second tabs are omitted.
Figure 9:
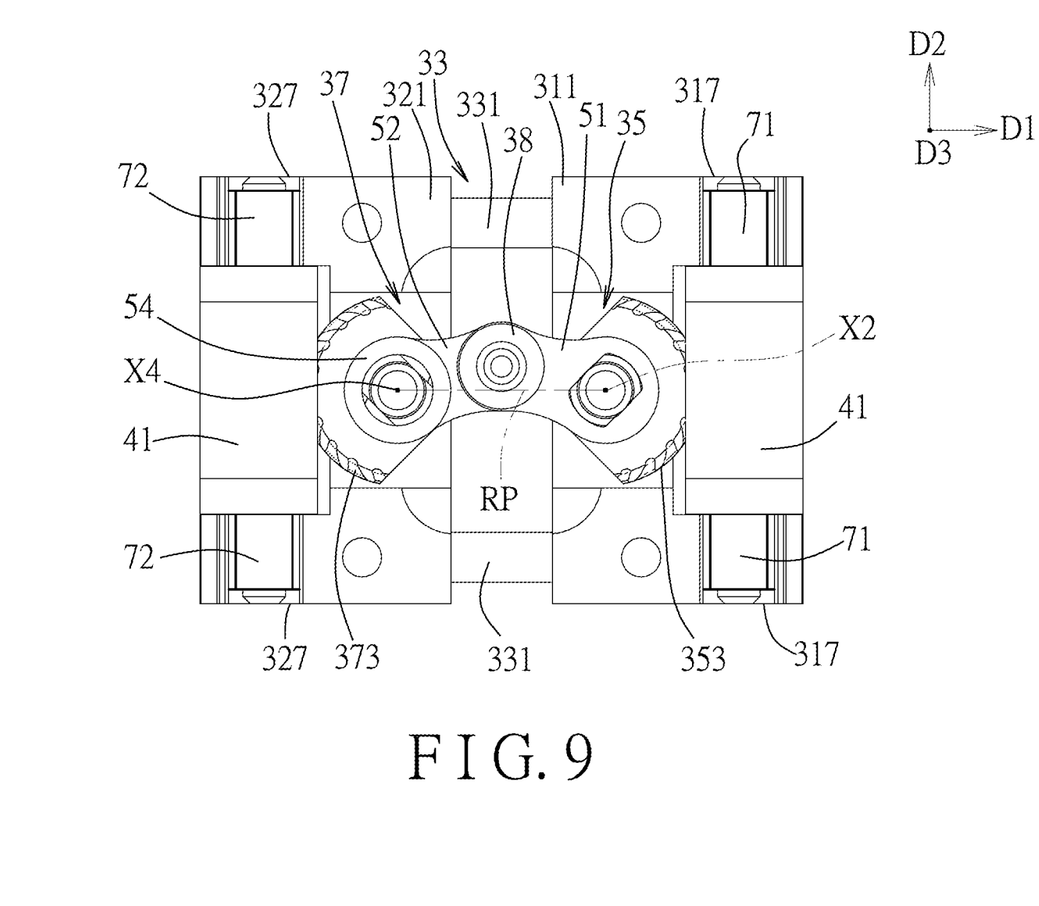
FIG. 9 is similar to FIG. 8 in which the first and second cover plates and the first and second tabs are omitted.

The shift pin 38 is coupled to the first and second shafts 351, 371 such that in response to rotation of at least one of the first and second sector gears 35, 37, the shift pin 38 is permitted to be displaced between a first position corresponding to the close position, and a second position corresponding to the remote position. When the shift pin 38 is in the first position, as shown in FIG. 5, the shift pin 38 is distal from a reference plane (RP) defined by the first and second upright axes (X2, X4). When the shift pin 38 is in the second position, as shown in FIG. 9, the shift pin 38 is proximate to the reference plane (RP).

In an embodiment shown in FIGS. 4 and 5, each of the first left end region 311 and the second right end region 321 may have a cutout 301 configured such that when the first sliding body 31 is in the close position, the cutouts 301 of the first left end region 311 and the second right end region 321 together define a receiving zone 302 for receiving the shift pin 38.

Figure 6:
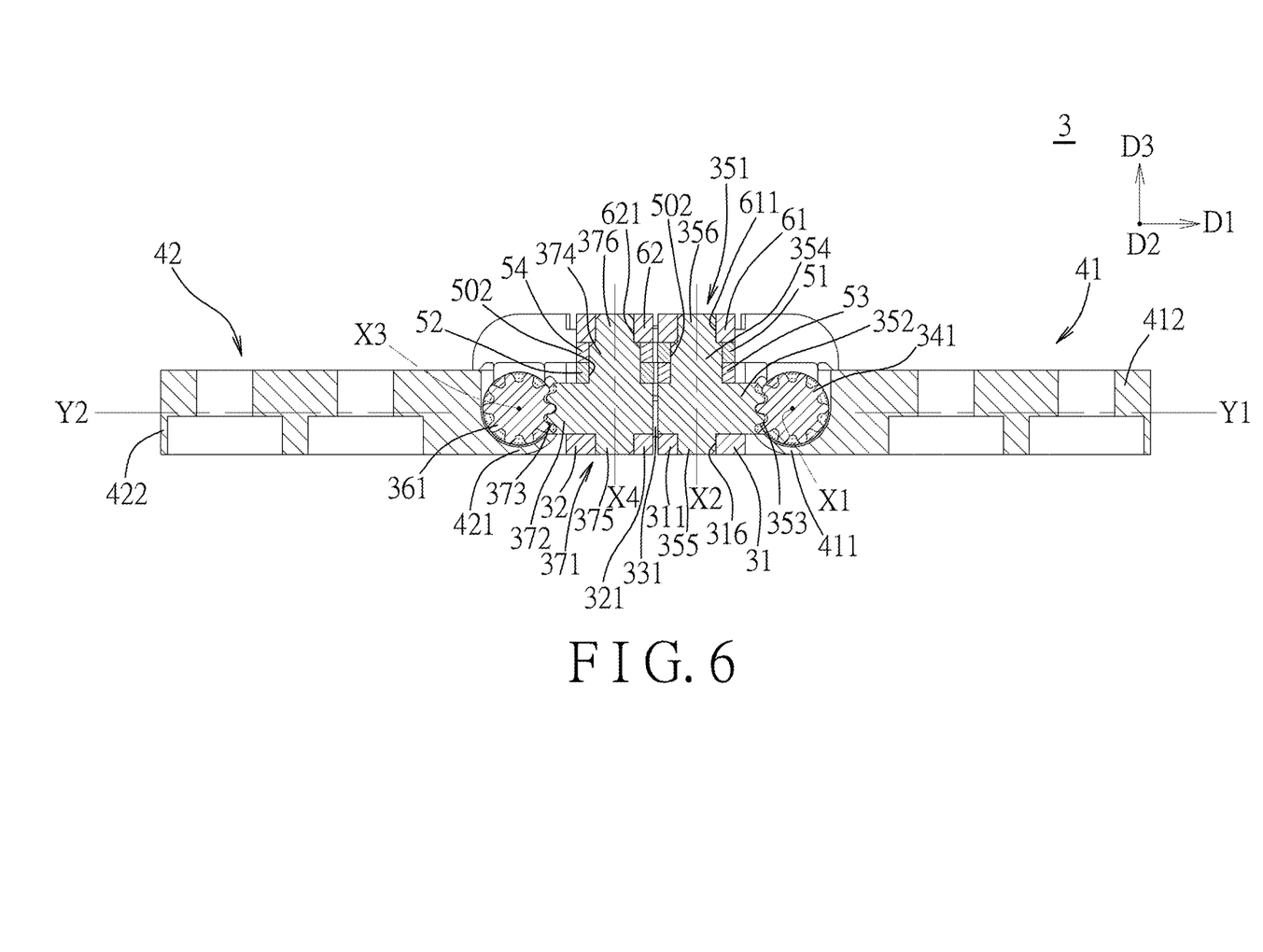
FIG. 6 is a cross-sectional view taken along line VI-VI of FIG. 3.

As shown in FIGS. 4, 6, and 11, the first mounting block 41 extends along a first lengthwise line (Y1) to terminate at a first actuating end segment 411 and a first mounting end segment 412. The first mounting end segment 412 is mounted on the mounting major surface 206 of the first substrate 21 to permit the first mounting block 41 to move with the first substrate 21. The second mounting block 42 extends along a second lengthwise line (Y2) to terminate at a second actuating end segment 421 and a second mounting end segment 422. The second mounting end segment 422 is mounted on the mounting major surface 206 of the second substrate 22 to permit the second mounting block 42 to move with the second substrate 22. Each of the first and second actuating end segments 411, 421 is coupled to rotate with a respective one of the first and second worm gears 34, 36 about a corresponding one of the first and second longitudinal axes (X1, X3).

Figure 7:
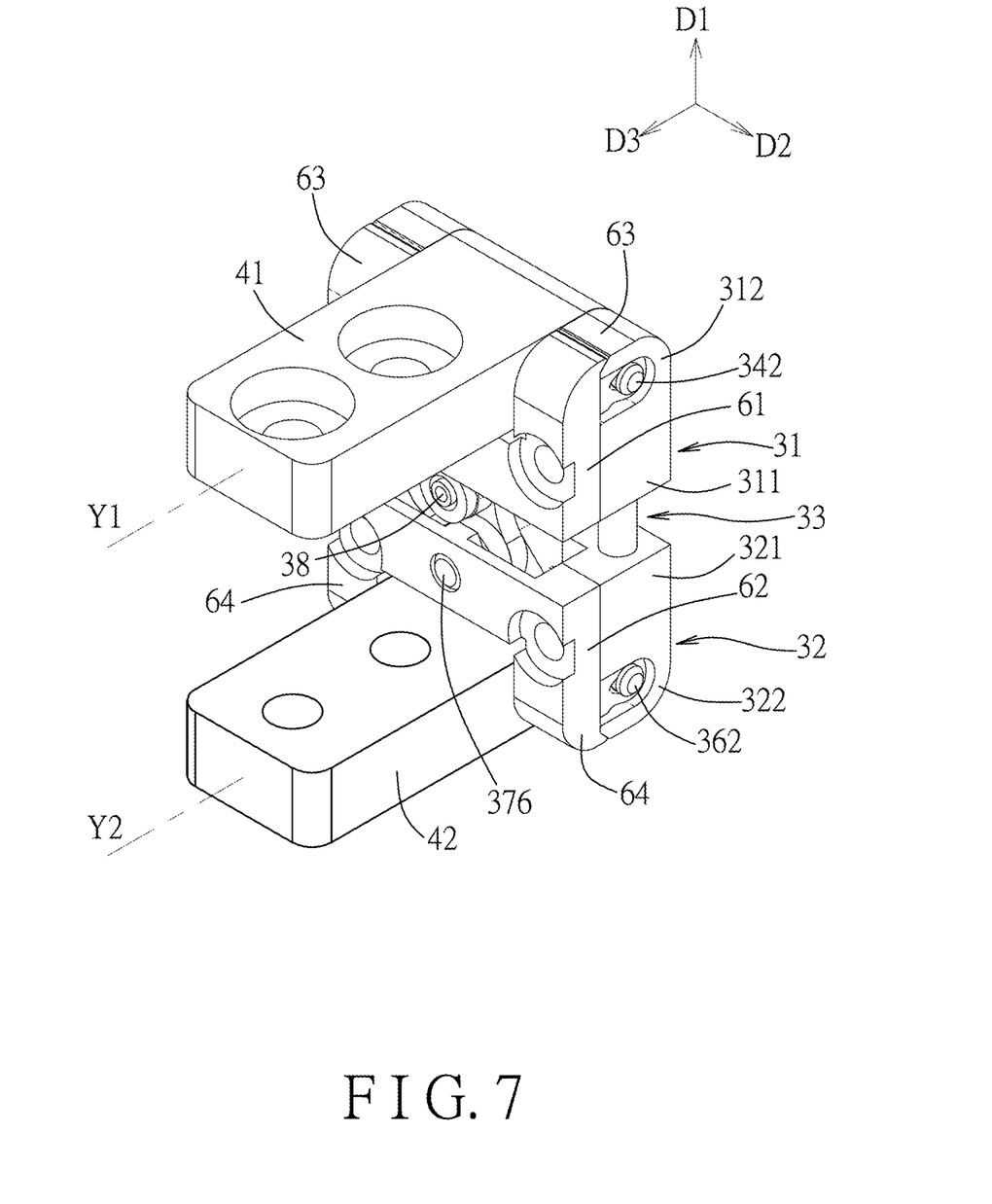
FIG. 7 is similar to FIG. 2 but illustrating that both of first and second mounting blocks of the positionable hinge mechanism are in a converted position.
Figure 8:
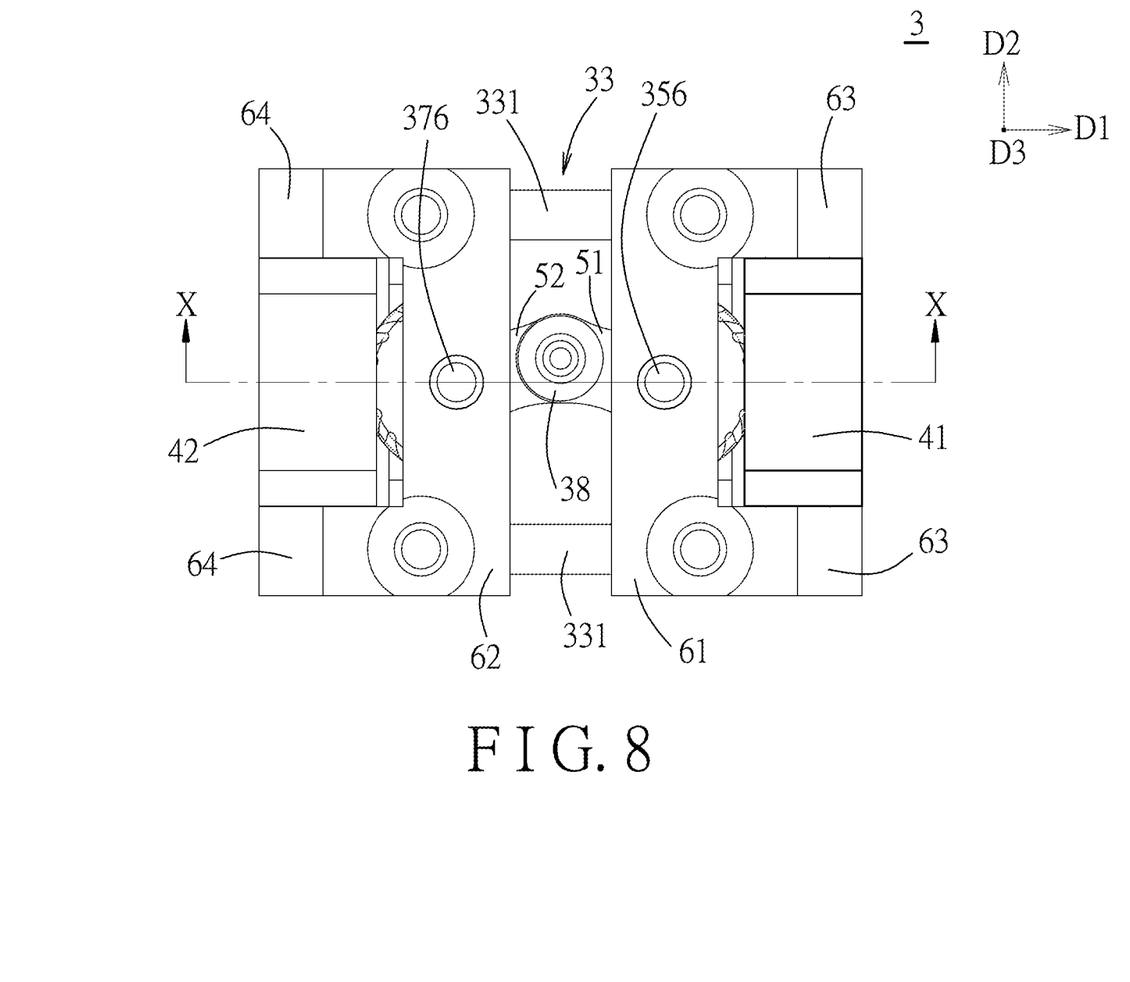
FIG. 8 is a side view of the positionable hinge mechanism shown in FIG. 7 from the upright direction.
Figure 10:
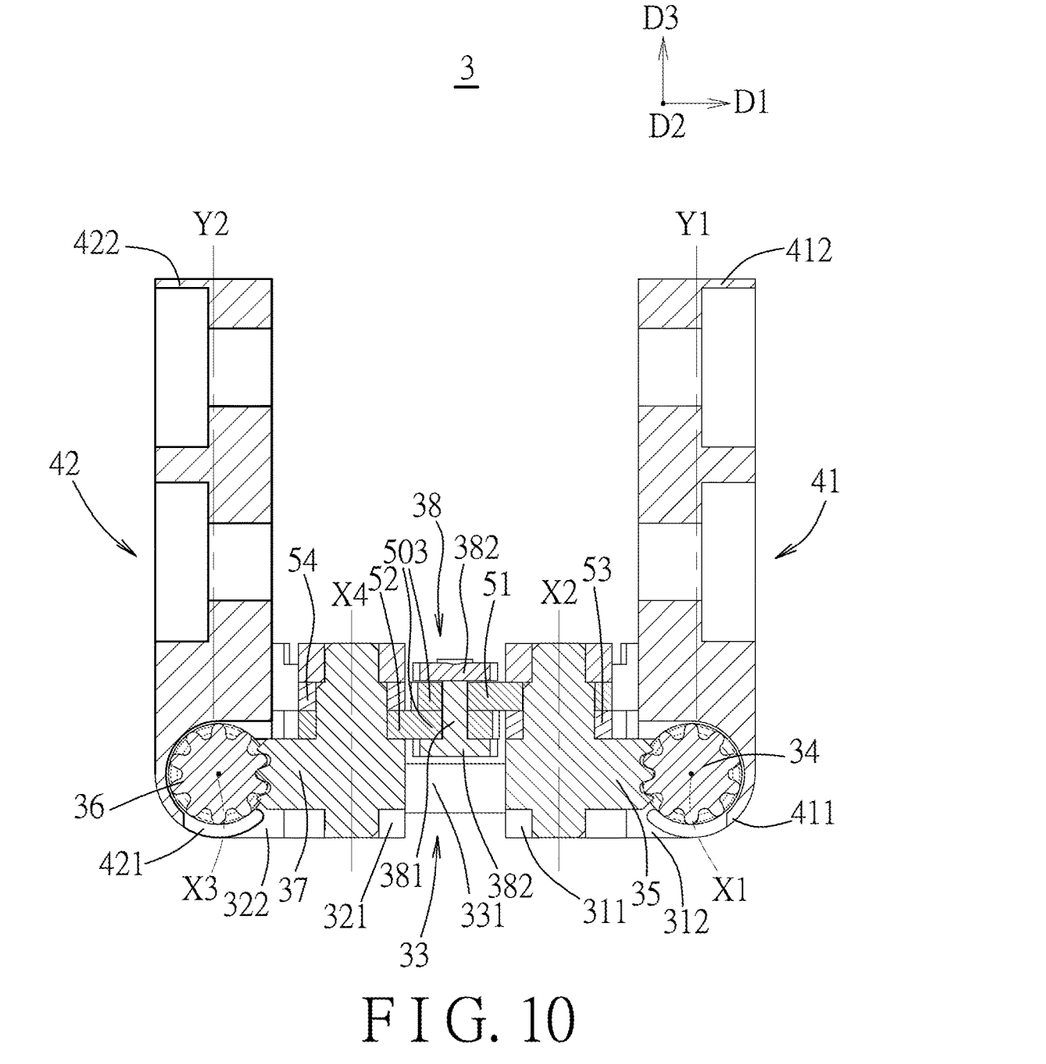
FIG. 10 is a cross-sectional view taken along line X-X of FIG. 8.

In response to application of a manual force upon at least one of the first and second substrates 21, 22, a corresponding one of the first and second mounting blocks 41, 42 is angularly displaceable between a normal position and a converted position. In the normal position, as shown in FIGS. 2 and 6, a corresponding one of the first and second lengthwise lines (Y1, Y2) is oriented in the left-and-right direction (D1). In the converted position, as shown in FIGS. 7 and 10, the corresponding one of the first and second lengthwise lines (Y1, Y2) is not oriented in the left-and-right direction (D1). Once the manual force is released, the first and second mounting blocks 41, 42 are retained by the first and second worm gears 34, 36 respectively with the first and second frictional forces, thereby angularly positioning the first substrate 21 relative to the second substrate 22.

Figure 12:
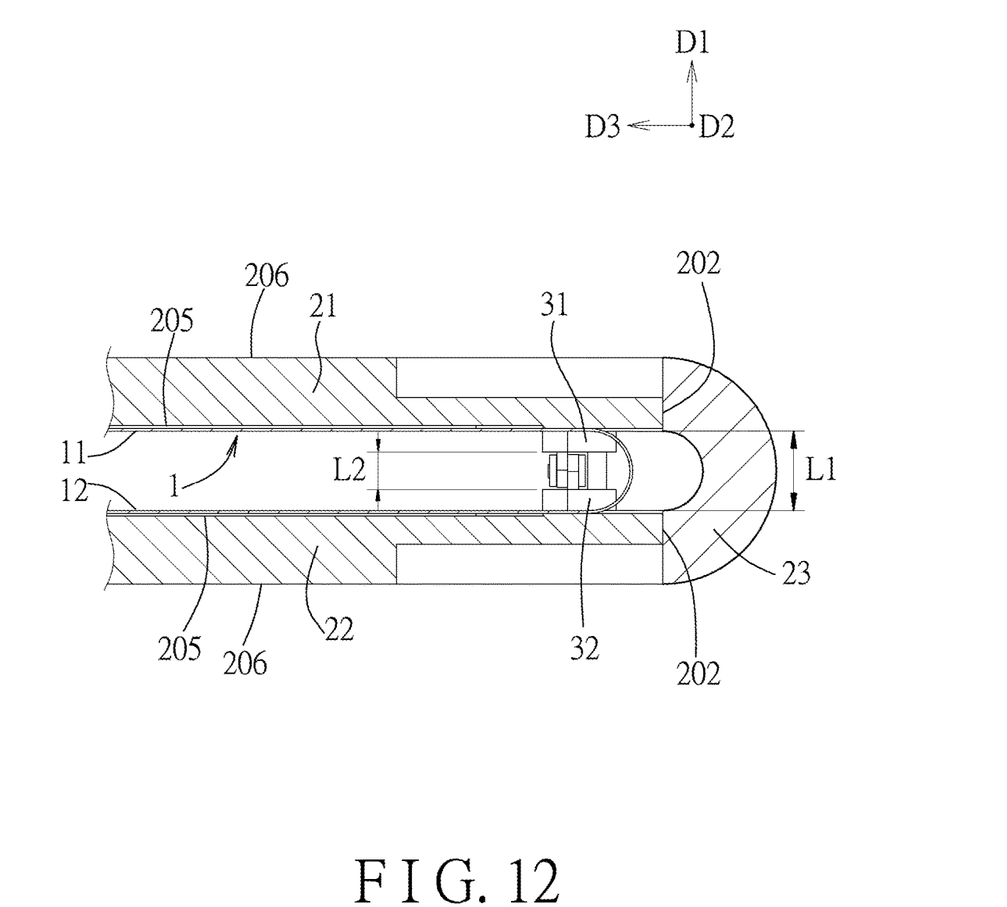
FIG. 12 is a cross-sectional view taken along line XII-XII of FIG. 11.

In an embodiment shown in FIGS. 7 and 10, in the converted position, the corresponding one of the first and second lengthwise lines (Y1, Y2) is oriented in the upright direction (D3). In addition, in the converted position, as shown in FIG. 12, the supporting major surfaces 205 of the first and second substrates 21, 22 are spaced apart from each other by a first distance (L1), and the first and second sliding bodies 31, 32 are spaced apart from each other by a second distance (L2) smaller than the first distance (L1).

The flexible display 1 has a first portion 11 and a second portion 12. The first portion 11 is supported by the support major surface 205 of the first substrate 21, and the second portion 12 is supported by the supporting major surface 205 of the second substrate 22 so as to permit the flexible display 1 to be bent with angular movement of the first substrate 21 relative to the second substrate 22.

In an embodiment shown in FIGS. 4-6 and 8-10, the positionable hinge mechanism 3 may further include a first coupling piece 51 and a second coupling piece 52. Each of the first and second coupling pieces 51, 52 is configured to couple a respective one of the first and second shafts 351, 371 to the shift pin 38, and includes a shaft-side segment 501 and a pin-side segment 503. The shaft-side segment 501 is formed with an engaging hole 502 configured to permit a corresponding one of the first and second shafts 351 to be non-rotatably engaged therein, to thereby allow the first and second coupling pieces 51, 52 to respectively rotate with the first and second sector gears 35, 37. The pin-side segment 503 is opposite to the shaft-side segment 501, and is formed with a passing hole 504 configured to loosely engage therein the shift pin 38 so as to permit rotation of each of the first and second sector gears 35, 37 to be translated into displacement of the shift pin 38.

In an embodiment shown in FIGS. 4 and 10, the shift pin 38 may include a pin body 381 extending lengthwise to terminate at two enlarged ends 382 which are configured to confine movement of the pin-side segments 503 of the first and second coupling pieces 51, 52.

In an embodiment shown in FIGS. 4 and 6, the first shaft 351 may have a first upper shaft segment 354 and a first lower shaft end 355 which are disposed at opposite sides of the first gear body 352. The first upper shaft segment 354 is configured to be non-rotatably fitted in the engaging hole 502 of the first coupling piece 51. The first sliding body 31 may have a first lower bearing hole 316 which extends along the first upright axis (X2), and which is configured to permit the first lower shaft end 355 to be journaled therein. Similarly, the second shaft 371 may have a second upper shaft segment 374 and a second lower shaft end 375 which are disposed at two opposite sides of the second gear body 372. The second upper shaft segment 374 is configured to be non-rotatably fitted in the engaging hole 502 of the second coupling piece 52. The second sliding body 32 may have a second lower bearing hole 326 which extends along the second upright axis (X4), and which is configured to permit the second lower shaft end 375 to be journaled therein.

In an embodiment shown in FIGS. 4 and 6, the first shaft 351 may have a first upper shaft end 356 extending from the first upper shaft segment 354, and the second shaft 371 may have a second upper shaft end 376 extending from the second upper shaft segment 374. In addition, the positionable hinge mechanism 3 may further include a first cover plate 61 and a second cover plate 62. The first cover plate 61 is mounted on the first left end region 311 to cover the first left groove segment 314, and has a first upper bearing hole 611 that extends along the first upright axis (X2), and that is configured to permit the first upper shaft end 356 to be journaled therein. The second cover plate 62 is mounted on the second right end region 321 to cover the second right groove segment 324, and has a second upper bearing hole 621 that extends along the second upright axis (X4), and that is configured to permit the second upper shaft end 376 to be journaled therein.

In an embodiment shown in FIGS. 4, 6, and 10, the positionable hinge mechanism 3 may further includes a first washer ring 53 and a second washer ring 54. The first washer ring 53 may be sleeved on the first upper shaft segment 354 and disposed between the first coupling piece 51 and the first gear body 352. The second washer ring 54 may be sleeved on the second shaft segment 374 and disposed between the second coupling piece 52 and the second cover plate 62.

In an embodiment shown in FIGS. 2, 4, and 5, the first right end region 312 may include a pair of first grooved seats 317 which are separated by the first right groove segment 315. The first worm gear 34 may have a pair of first journal ends 342 which are disposed at two opposite sides of the first worm body 341. The second left end region 322 may include a pair of second grooved seats 327 which are separated by the second left groove segment 325. The second worm gear 36 may have a pair of second journal ends 362 which are disposed at two opposite sides of the second worm body 361.

In addition, the positionable hinge mechanism 3 may further include a pair of first journal bearings 71 and a pair of second journal bearings 72. Each of the first journal bearings 71 has a first outer peripheral surface 711 and a first bearing surface 712. The first outer peripheral surface 711 is configured to be non-rotatably retained in a respective one of the first grooved seats 317. The first bearing surface 712 is configured to permit a respective one of the first journal ends 342 to be journaled thereon with a third friction force to prevent rotation of the first worm gear 34 when the manual force is released. Each of the second journal bearings 72 has a second outer peripheral surface 721 and a second bearing surface 722. The second outer peripheral surface 721 is configured to be non-rotatably retained in a respective one of the second grooved seats 327. The second bearing surface 722 is configured to permit a respective one of the second journal ends 362 to be journaled thereon with a fourth friction force to prevent rotation of the second worm gear 36 when the manual force is released.

In an embodiment shown in FIGS. 2 and 4, the positionable hinge mechanism 3 may further include a pair of first tabs 63 and a pair of second tabs 64. Each of the first tabs 63 extends from the first cover plate 61 over a respective one of the first journal bearings 71 so as to ensure the respective first journal bearing 71 to be retained in the respective first grooved seat 317. Similarly, each of the second tabs 64 extends from the second cover plate 62 over a respective one of the second journal bearings 72 so as to ensure the respective second journal bearing 72 to be retained in the respective second grooved seat 327.

Figure 3:
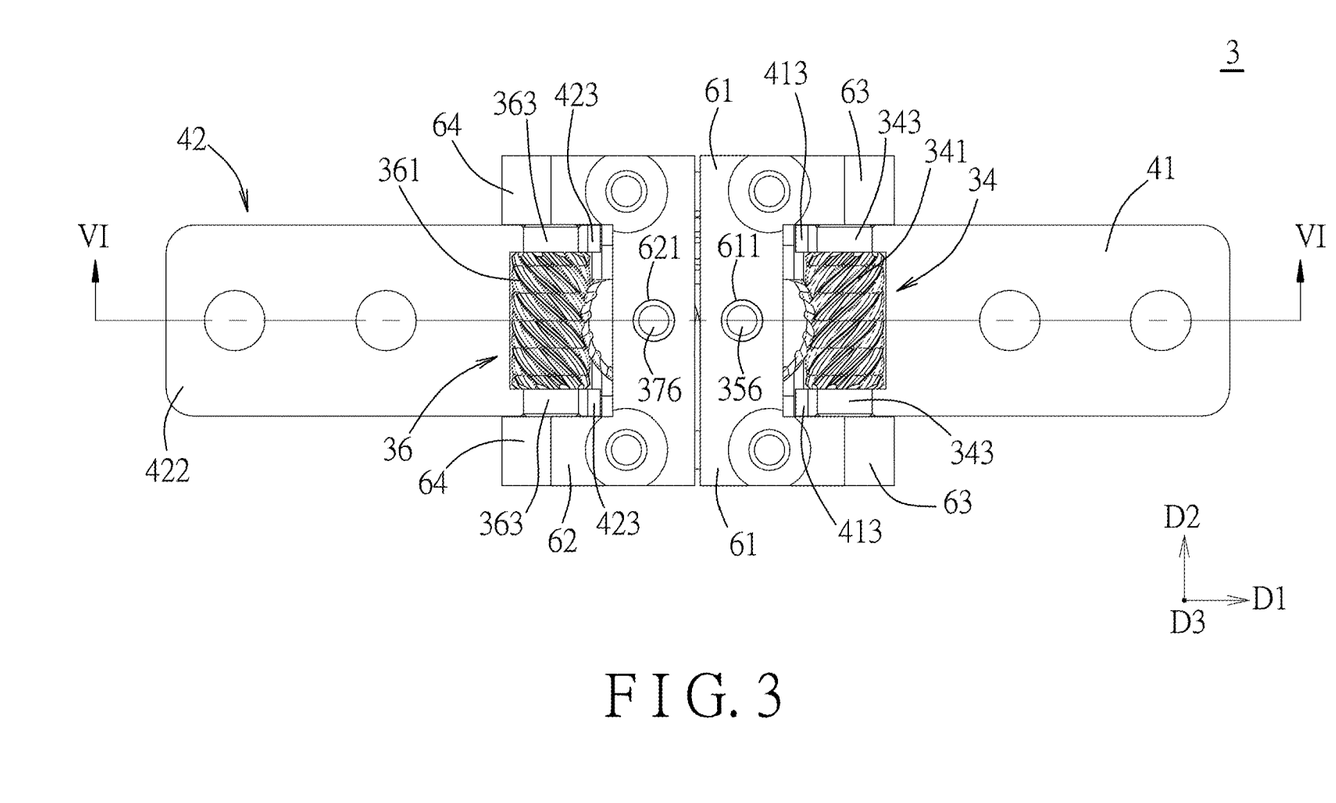
FIG. 3 is a side view of the positionable hinge mechanism shown in FIG. 2 from an upright direction.

In an embodiment shown in FIGS. 3 and 4, the first worm gear 34 may have a pair of first gripped regions 343 each of which is disposed between the first worm body 341 and a respective one of the first journal ends 342, and the first actuating end segment 411 of the first mounting block 41 may have a pair of first jaw regions 413 each of which is configured to grasp a respective one of the first gripped regions 343 with a fifth friction force so as to permit co-rotation of the first worm gear 34 and the first mounting block 41. Similarly, the second worm gear 36 may have a pair of second gripped regions 363 each of which is disposed between the second worm body 361 and a respective one of the second journal ends 362, and the second actuating end segment 421 of the second mounting block 42 may have a pair of second jaw regions 423 each of which is configured to grasp a respective one of the second gripped regions 363 with a sixth friction force so as to permit co-rotation of the second worm gear 36 and the second mounting block 42.

In an embodiment shown in FIGS. 4, 6, and 10, the guiding unit 33 may include a pair of guiding rod 331, a pair of right guiding holes 334, and a pair of left guiding holes 335. Each of the guiding rods 331 extends in the left-and-right direction (D1), and has a left rod segment 332 and a right rod segment 333. The right guiding holes 334 are formed in the first left end region 311 respectively at two opposite sides of the first open groove 313. Each of the right guiding holes 334 extends toward the first right end region 312 in the left-and-right direction (D1), and is configured to permit the right rod segment 333 of a respective one of the guiding rods 331 to be movably fitted therein. The left guiding holes 335 are formed in the second right end region 321 respectively at two opposite sides of the second open groove 323. Each of the left guiding holes 335 extends toward the second left end region 322 in the left-and-right direction (D1), and is configured to permit the left rod segment 332 of a respective one of the guiding rods 331 to be movably fitted therein so as to guide movement of the first sliding body 31 relative to the second sliding body 32 in the left-and-right direction (D1).

In an embodiment shown in FIGS. 1, 11, and 12, the angularly positionable flexible display device may further include a resilient shielding piece 23 which extends in the front-and-rear direction (D2), and which interconnects the inner side surfaces 202 of the first and second substrates 21, 22 to permit the resilient shielding piece 23 to be stretchable between the first and second substrates 21, 22.

In an embodiment shown in FIGS. 1 and 11, the inner side surface 202 of each of the first and second substrates 21, 22 has two of the slots 203 which are disposed at two opposite sides of the flexible display 1, and the first and second substrates 21, 22 define two of the mounting spaces 200. The angularly positionable flexible display device includes two of the positionable hinge mechanisms 3 disposed in the mounting spaces 200, respectively.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A positionable hinge mechanism for angularly positioning a first substrate relative to a second substrate, each of the first and second substrates having an outer side surface, an inner side surface opposite to the outer side surface, a supporting major surface, and a mounting major surface opposite to the support major surface, each of the supporting and mounting major surfaces interconnecting the respective outer and inner side surfaces, the inner side surface having at least one slot which extends toward the respective outer side surface to terminate at a slot end, and which further extends through the respective supporting and mounting major surfaces, the inner side surfaces of the first and second substrates being disposed adjacent to each other to permit the slots of the first and second substrates to define a mounting space, said positionable hinge mechanism being adapted to be disposed in the mounting space, and comprising:

a first sliding body;

a second sliding body which is displaced from said first sliding body in a left-and-right direction;

a shift pin coupled between said first and second sliding bodies;

a guiding unit extending in said left-and-right direction to guide movement of said first sliding body relative to said second sliding body in said left-and-right direction between a close position and a remote position; and a first force-transmission unit and a second force-transmission unit, which are disposed on said first and second sliding bodies, respectively, each of said first and second force-transmission units being configured to be coupled to said shift pin, and being coupled to be driven by a respective one of the first and second substrates such that in response to application of a manual force upon at least one of the first and second substrates, said first sliding body is moveable relative to said second sliding body between said close position and said remote position, and such that once the manual force is released, said first sliding body is immovable relative to said second sliding body, thereby angularly positioning the first substrate relative to the second substrate.

2. The positionable hinge mechanism according to claim 1, wherein said first sliding body is movably disposed in the slot of the first substrate, and has a first left end region and a first right end region which is opposite to said first left end region in said left-and-right direction for being disposed proximate to the slot end of the first substrate, said first sliding body being formed with a first open groove which extends in said left-and-right direction through said first left and right end regions to form a first left groove segment and a first right groove segment, said second sliding body is movably disposed in the slot of the second substrate to be displaced from said first sliding body in said left-and-right direction, and has a second right end region confronting said first left end region, and a second left end region which is opposite to said second right end region in said left-and-right direction for being disposed proximate to the slot end of the second substrate, said second sliding body being formed with a second open groove which extends in said left-and-right direction through said second right and left end regions to form a second right groove segment and a second left groove segment, said guiding unit extends in said left-and-right direction to guide movement of said first sliding body relative to said second sliding body in said left-and-right direction between said close position, where said first left end region and said second right end region are close to each other, and said remote position, where said first left end region and said second right end region are remote from each other, said first force-transmission unit includes
- a first worm gear which extends along a first longitudinal axis in a front-and-rear direction, and which has a first worm body, said first worm gear being rotatably mounted on said first right end region about said first longitudinal axis to permit said first worm body to be disposed in said first right groove segment, and
- a first sector gear which is rotatably mounted in said first left groove segment about a first upright axis in an upright direction, and which includes a first shaft extending along said first upright axis, and a first gear body extending radially from said first shaft to terminate at a first gear region that is configured to mesh with said first worm body with a first friction force to permit said first sector gear to be driven by said first worm gear to rotate, a second force-transmission unit includes
- a second worm gear which extends along a second longitudinal axis in said front-and-rear direction, and which has a second worm body, said second worm gear being rotatably mounted on said second left end region about said second longitudinal axis to permit said second worm body to be disposed in said second left groove segment, and
- a second sector gear which is rotatably mounted in said second right groove segment about a second upright axis in said upright direction, and which includes a second shaft extending along said second upright axis, and a second gear body extending radially from said second shaft to terminate at a second gear region that is configured to mesh with said second worm body with a second friction force to permit said second sector gear to be driven by said second worm gear to rotate, and said shift pin is coupled to said first and second shafts such that in response to rotation of at least one of said first and second sector gears, said shift pin is permitted to be displaced between a first position corresponding to said close position, where said shift pin is distal from a reference plane defined by said first and second upright axes, and a second position corresponding to said remote position, where said shift pin is proximate to said reference plane, said positionable hinge mechanism further comprising a first mounting block and a second mounting block, said first mounting block extending along a first lengthwise line to terminate at a first actuating end segment, and a first mounting end segment for being mounted on the mounting major surface of the first substrate to permit said first mounting block to move with the first substrate, said second mounting block extending along a second lengthwise line to terminate at a second actuating end segment, and a second mounting end segment for being mounted on the mounting major surface of the second substrate to permit said second mounting block to move with the second substrate, each of said first and second actuating end segments being coupled to rotate with a respective one of said first and second worm gears about a corresponding one of said first and second longitudinal axes, such that in response to application of the manual force upon at least one of the first and second substrates, a corresponding one of said first and second mounting blocks is angularly displaceable between a normal position, where a corresponding one of said first and second lengthwise lines is oriented in said left-and-right direction, and a converted position, where said corresponding one of said first and second lengthwise lines is not oriented in said left-and-right direction, and such that once the manual force is released, said first and second mounting blocks are retained by said first and second worm gears respectively with the first and second frictional forces, thereby angularly positioning the first substrate relative to the second substrate.

3. The positionable hinge mechanism according to claim 2, further comprising a first coupling piece and a second coupling piece, each of which is configured to couple a respective one of said first and second shafts to said shift pin, and each of which includes
- a shaft-side segment formed with an engaging hole configured to permit a corresponding one of said first and second shafts to be non-rotatably engaged therein, to thereby allow said first and second coupling pieces to respectively rotate with said first and second sector gears, and
- a pin-side segment which is opposite to said shaft-side segment, and which is formed with a passing hole configured to loosely engage therein said shift pin so as to permit rotation of each of said first and second sector gears to be translated into displacement of said shift pin.

4. The positionable hinge mechanism according to claim 3, wherein said shift pin includes a pin body extending lengthwise to terminate at two enlarged ends which are configured to confine movement of said pin-side segments of said first and second coupling pieces.

5. The positionable hinge mechanism according to claim 3, wherein said first shaft has a first upper shaft segment and a first lower shaft end which are disposed at opposite sides of said first gear body, said first upper shaft segment being configured to be non-rotatably fitted in said engaging hole of said first coupling piece, said first sliding body has a first lower bearing hole which extends along said first upright axis, and which is configured to permit said first lower shaft end to be journaled therein, said second shaft has a second upper shaft segment and a second lower shaft end which are disposed at two opposite sides of said second gear body, said second upper shaft segment being configured to be non-rotatably fitted in said engaging hole of said second coupling piece, and said second sliding body has a second lower bearing hole which extends along said second upright axis, and which is configured to permit said second lower shaft end to be journaled therein.

6. The positionable hinge mechanism according to claim 5, wherein said first shaft has a first upper shaft end extending from said first upper shaft segment, and said second shaft has a second upper shaft end extending from said second upper shaft segment, said positionable hinge mechanism further comprising:
- a first cover plate which is mounted on said first left end region to cover said first left groove segment, and which has a first upper bearing hole that extends along said first upright axis, and that is configured to permit said first upper shaft end to be journaled therein; and
- a second cover plate which is mounted on said second right end region to cover said second right groove segment, and which has a second upper bearing hole that extends along said second upright axis, and that is configured to permit said second upper shaft end to be journaled therein.

7. The positionable hinge mechanism according to claim 6, wherein
- said first right end region includes a pair of first grooved seats which are separated by said first right groove segment,
- said first worm gear has a pair of first journal ends which are disposed at two opposite sides of said first worm body,
- said second left end region includes a pair of second grooved seats which are separated by said second left groove segment, and
- said second worm gear has a pair of second journal ends which are disposed at two opposite sides of said second worm body, said positionable hinge mechanism further comprising:
- a pair of first journal bearings each of which has a first outer peripheral surface configured to be non-rotatably retained in a respective one of said first grooved seats, and each of which has a first bearing surface configured to permit a respective one of said first journal ends to be journaled thereon with a third friction force to prevent rotation of said first worm gear when the manual force is released; and
- a pair of second journal bearings each of which has a second outer peripheral surface configured to be non-rotatably retained in a respective one of said second grooved seats, and each of which has a second bearing surface configured to permit a respective one of said second journal ends to be journaled thereon with a fourth friction force to prevent rotation of said second worm gear when the manual force is released.

8. The positionable hinge mechanism according to claim 7, further comprising:
- a pair of first tabs each extending from said first cover plate over a respective one of said first journal bearings so as to ensure said respective first journal bearing to be retained in said respective first grooved seat; and
- a pair of second tabs each extending from said second cover plate over a respective one of said second journal bearings so as to ensure said respective second journal bearing to be retained in said respective second grooved seat.

9. The positionable hinge mechanism according to claim 7, wherein
- said first worm gear has a pair of first gripped regions each of which is disposed between said first worm body and a respective one of said first journal ends,
- said first actuating end segment of said first mounting block has a pair of first jaw regions each of which is configured to grasp a respective one of said first gripped regions with a fifth friction force so as to permit co-rotation of said first worm gear and said first mounting block,
- said second worm gear has a pair of second gripped regions each of which is disposed between said second worm body and a respective one of said second journal ends, and
- said second actuating end segment of said second mounting block has a pair of second jaw regions each of which is configured to grasp a respective one of said second gripped regions with a sixth friction force so as to permit co-rotation of said second worm gear and said second mounting block.

10. The positionable hinge mechanism according to claim 2, wherein said guiding unit includes
- a pair of guiding rods each extending in said left-and-right direction, and each having a left rod segment and a right rod segment,
- a pair of right guiding holes formed in said first left end region respectively at two opposite sides of said first open groove, each of said right guiding holes extending toward said first right end region in said left-and-right direction, and being configured to permit said right rod segment of a respective one of said guiding rods to be movably fitted therein, and
- a pair of left guiding holes formed in said second right end region respectively at two opposite sides of said second open groove, each of said left guiding holes extending toward said second left end region in said left-and-right direction, and being configured to permit said left rod segment of a respective one of said guiding rods to be movably fitted therein so as to guide movement of said first sliding body relative to said second sliding body in said left-and-right direction.

* * * * *